United States Patent [19]

Datseris et al.

[11] Patent Number: 4,466,768

[45] Date of Patent: Aug. 21, 1984

[54] APPARATUS FOR MANIPULATING A WORKPIECE OR THE LIKE

[75] Inventors: Philip S. Datseris; Ali C. Sayder; William J. Palm, all of Kingston, R.I.

[73] Assignee: The Board of Regents for Education for the State of Rhode Island, Providence, R.I.

[21] Appl. No.: 359,885

[22] Filed: Mar. 19, 1982

[51] Int. Cl.³ .................. B65G 47/14; B25J 15/00
[52] U.S. Cl. ................. 414/729; 294/86 R; 294/DIG. 2; 414/757; 414/783; 198/375
[58] Field of Search .............. 198/375, 486, 394; 294/67 BB, 21, 86 R, DIG. 2; 414/483, 729–731, 757, 783, 619, 672, 785

[56] References Cited

U.S. PATENT DOCUMENTS 1,752,737  4/1930  Grinnell .................. 294/21
3,776,584 12/1973  Van Gerven ............... 294/21
4,198,189  4/1980  Brudi et al. .............. 414/620
4,212,577  7/1980  Swanson ................. 414/757 X

FOREIGN PATENT DOCUMENTS 7708542 2/1979 Switzerland ............ 414/619

Primary Examiner—Robert J. Spar
Assistant Examiner—Terrance L. Siemens

Attorney, Agent, or Firm—Thompson, Birch, Gauthier & Samuels

[57] ABSTRACT

An apparatus for manipulating a workpiece or the like comprising a pair of finger assemblies mounted on a common support. The finger assemblies have belts with contact surfaces arranged in a confronting relationship. A first operating mechanism is provided for moving the finger assemblies along a first axis towards each other to grip a workpiece between the belt contact surfaces. A second operating mechanism is provided for rotating the belts about the first axis in order to impart a corresponding rotation to the workpiece gripped therebetween. A third operating mechanism is provided for moving the belts in either the same or opposite directions in order to impart either translational movement to the workpiece along a second axis perpendicular to the first axis or rotational movement to the workpiece about the second axis. The first, second and third operating mechanisms are operable independently of each other, and the first operating mechanism is operable additionally to move the finger assemblies together in the same direction along the first axis to impart corresponding translational movement to the workpiece and also to move the finger assemblies along the first axis away from each other to release the workpiece from between the contact surfaces.

9 Claims, 14 Drawing Figures

APPARATUS FOR MANIPULATING A WORKPIECE OR THE LIKE

BACKGROUND OF THE INVENTION

1. Field of the Invention

This invention relates generally to robotics and is concerned in particular with an improved apparatus for manipulating workpieces and the like.

2. Description of the Prior Art

Robots usually include mechanisms for retrieving workpieces randomly arranged with unknown orientations in storage bins, on conveyor belts, etc. After being retrieved, the workpieces usually must be reoriented to a known attitude and position before further processing can take place. To accomplish this task with conventional retrieval mechanisms, the workpieces must be released and regrasped, often several times, during the course of their transfer from one work station to the next. This procedure is unduly complicated and time consuming, and it hampers the effective use of robots in many manufacturing processes.

SUMMARY OF THE PRESENT INVENTION

A basic objective of the present invention is the provision of an improved apparatus for retrieving randomly arranged workpieces and for manipulating them to a selected orientation and position without having to release and regrasp them.

A further objective of the present invention is the provision of an apparatus which is capable of rotating a retrieved workpiece about multiple mutually perpendicular axes.

Still another object of the present invention is the provision of an apparatus which has the capability of imparting translational motion to a retrieved workpiece in a number of different directions.

In a prefered embodiment to be described hereinafter in more detail, the present invention includes a pair of finger assemblies mounted on a common support. The finger assemblies have belts which define contact surfaces arranged in a confronting relationship. A first operating mechanism is employed to move the finger assemblies along a first axis towards each other to grip a workpiece or other like element between the contact surfaces of the belts. Depending upon the orientation of the workpiece, a second operating mechanism then may be employed to rotate the belts about the first axis in order to impart a corresponding rotation to the workpiece. A third operating mechanism also may be employed to move the belts in either the same or opposite directions in order to impart either translational movement to the workpiece along a second axis perpendicular to the first axis, or rotational movement about a third axis also perpendicular to the first axis. The first, second and third operating mechanisms are operable independently of each other, and the first operating mechanism is additionally operable to move the finger assemblies simultaneously in the same direction along the first axis to impart corresponding translational movement to the workpieces, and also to move the finger assemblies away from each other to release the workpiece from its retained position between the contact surfaces of the belts.

Other features and advantages of the present invention will become more apparent as the description proceeds with the aid of the accompanying drawings, wherein:

DESCRIPTION OF PREFERRED EMBODIMENT

Figure 1:
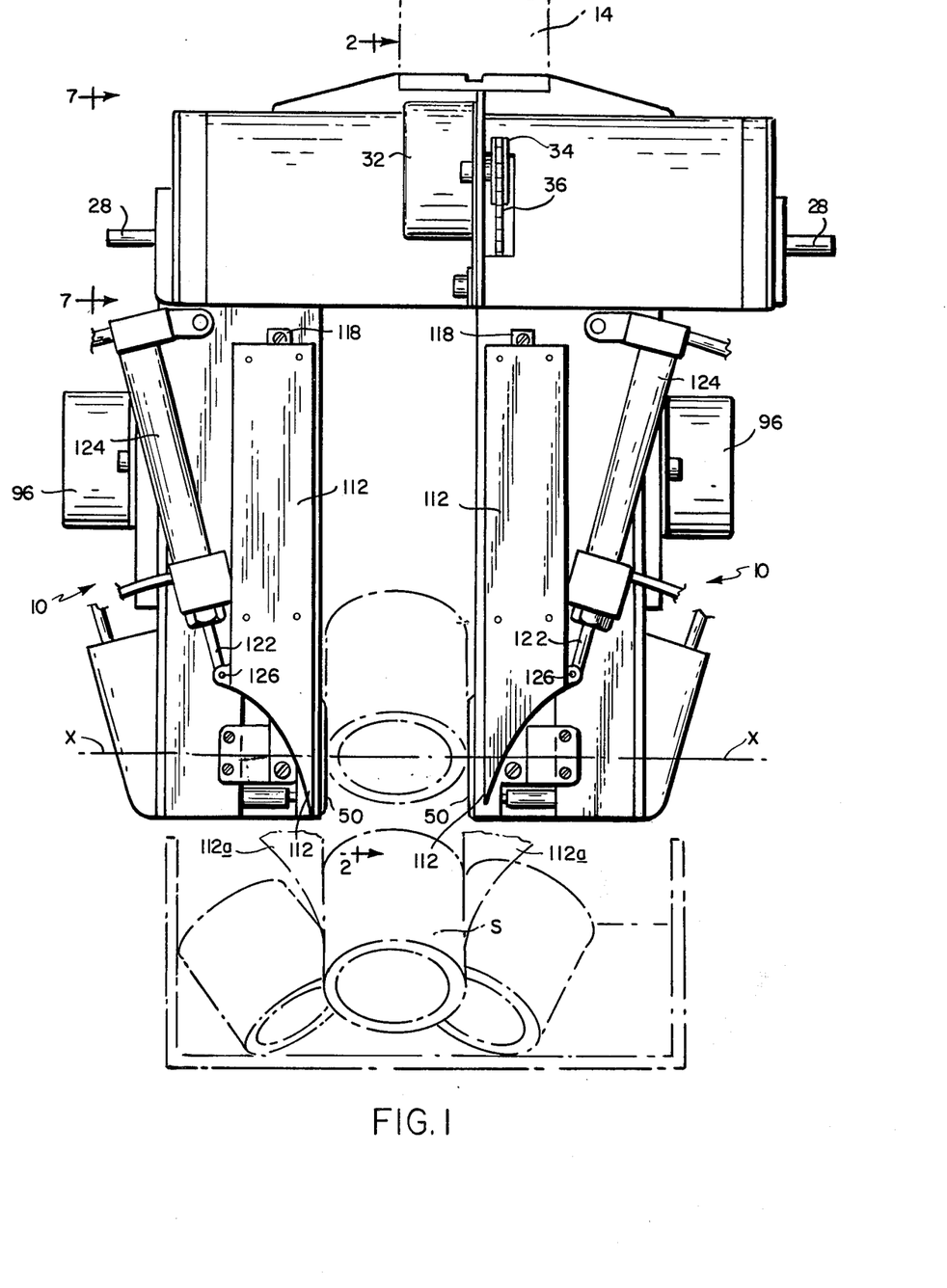
FIG. 1 is a view in front elevation of an apparatus in accordance with the present invention.
Figure 2:
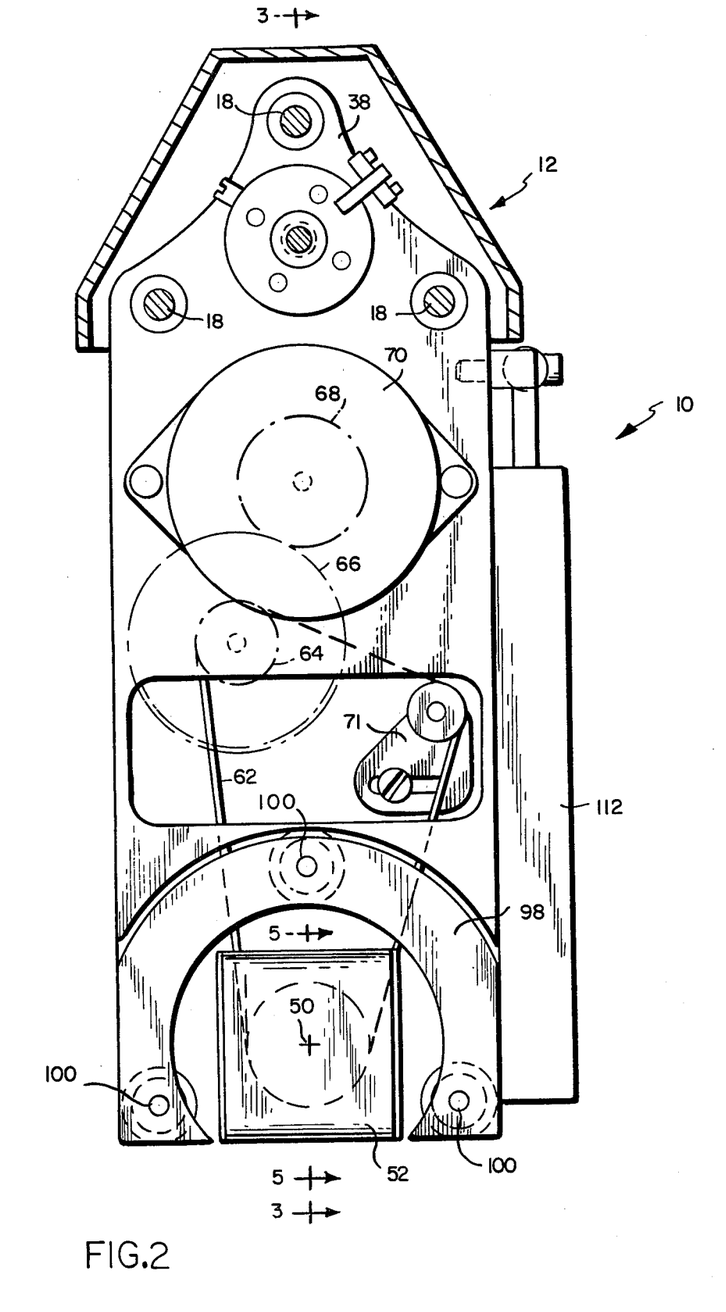
FIG. 2 is a sectional view taken on line 2—2 of FIG. 1.

Referring initially to FIG. 1, an apparatus in accordance with the present invention is shown comprising a pair of finger assemblies 10, depending from a hood structure 12 which is in turn secured to a support 14. The support 14 can comprise the end of a movable robot arm, or alternatively it can comprise any other movable or fixed member. The finger assemblies 10 are mirror images of each other, and hence a description of one will suffice for both.

Referring additionally to FIGS. 2, 3, 7 and 8, it will be seen that the hood structure 12 has an open bottom and end plates 16 supporting the ends of a plurality of parallel guide rods 18. The hood structure 12 further includes a central plate or web 20 having an open-ended sleeve 22 supporting bearings 24 which together with other bearings 26 in the end plates 16, carry coaxial shafts 28 which are rotatable independently of each other.

The shafts 28 have threaded portions 28', and each shaft also carries a sprocket 30. Reversible drive motors 32 are externally supported on the hood structure 12. The motors 32 have sprockets 34 on their output shafts which are connected via chains 36 to the sprockets 30 on the shafts 28.

Each finger assembly 10 has an upper flange 38 which protrudes upwardly into the hood structure 12. The flange 38 has tubular bosses 40 containing sleeve bearings 42 which support each finger assembly for slidable movement along the guide rods 18. The flange 38 also carries pins 44 which slidably support a nut 46 threaded onto the shaft 28. Springs 48 are interposed between the nut 46 and the flange 38.

The motors 32 and the components described above to mechanically connect them to the shafts 28 are included as part of a "first operating means" for moving the finger assemblies 10 in the direction of axis "X". By appropriately controlling the motors 32, the finger assemblies 10 can be moved in opposite directions either towards or away from each other, or they can be moved in unison in the same direction.

Each of the fingej
50 adjacent its lower end. In the preferred embodiment herein being described, the contact surfaces 50 are arranged in a confronting relationship, and as can best be seen by additional reference to FIGS. 2-6, each is defined by the exposed portion of a belt 52. The belt 52 is internally supported by a teflon head 54 connected by cross pins 56 to a sleeve-like platform 58. The platform 58 is in turn journalled by bearings for rotation about axis "X". The platform 58 has a sprocket 60 connected via a chain 62 to an idler sprocket 64 having a coaxially arranged pinion gear 66 meshing with a drive gear 68 on the output shaft of a reversible motor 70 carried on the inner side of the finger assembly 10. The chain 62 also passes around another idler sprocket carried on a bracket 71, the position of which can be adjusted to adjust chain tension. The motor 70 and the above-described components mechanically connecting it to the sprocket 60 are included as part of a "second operating means" for rotating the platform 58 and the belt 52 carried thereon about axis "X".

Figure 3:
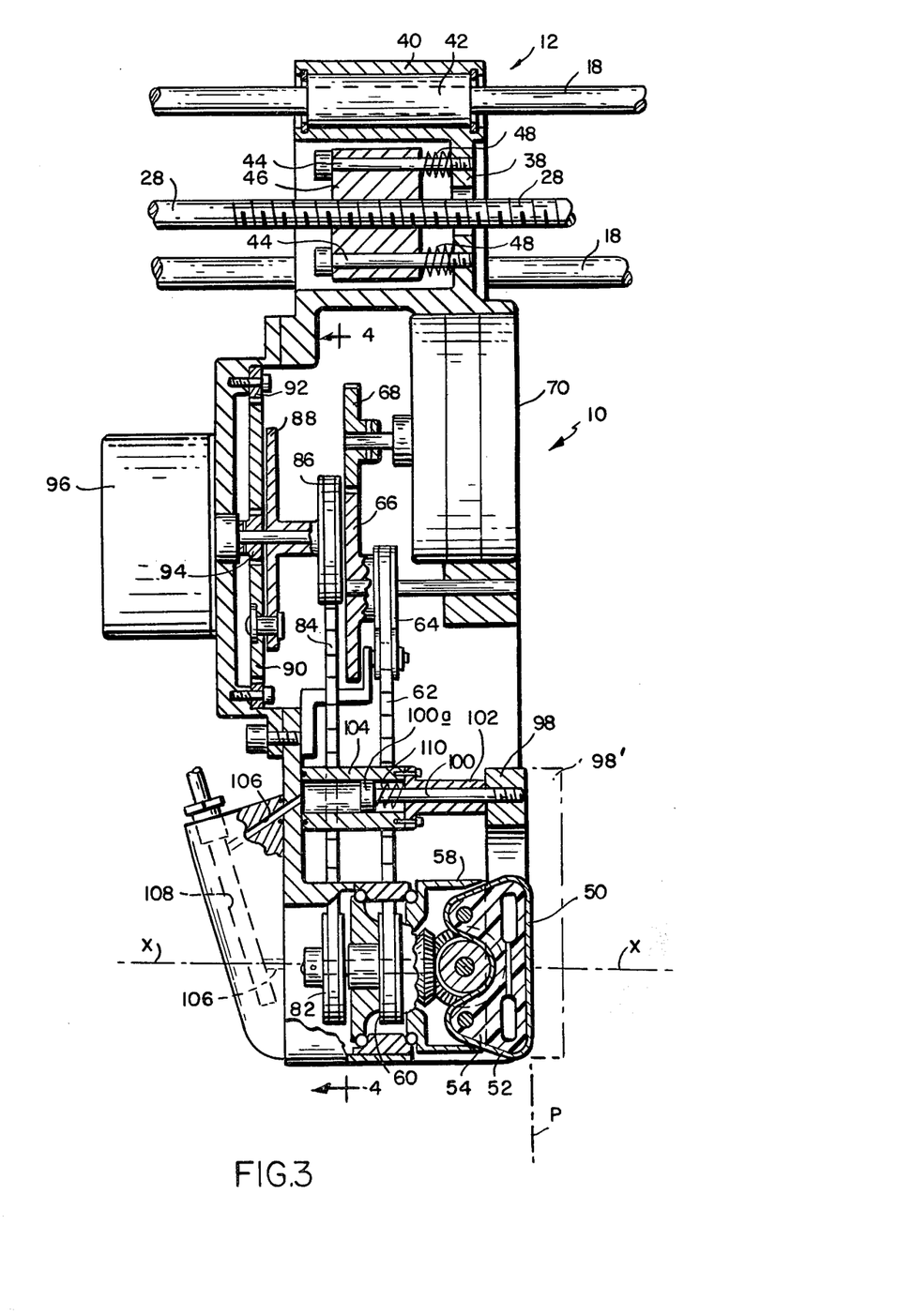
FIG. 3 is a sectional view taken on line 3—3 of FIG. 2.
Figure 4:
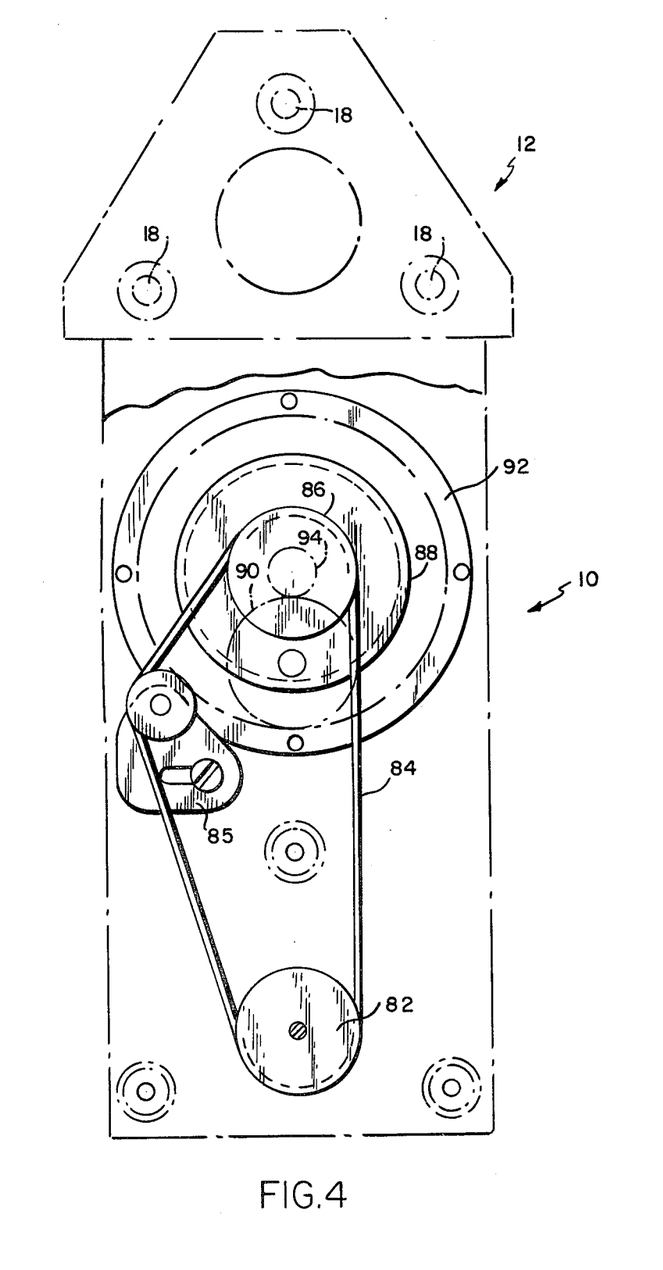
FIG. 4 is a sectional view taken along line 4—4 of FIG. 3.
Figure 5:
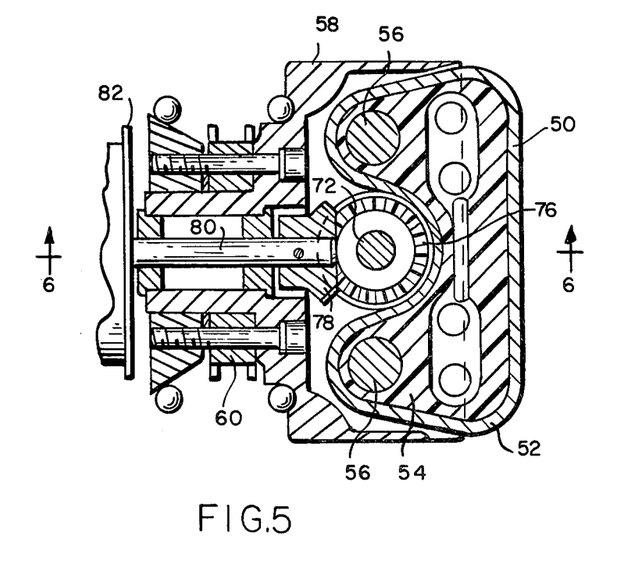
FIG. 5 is a sectional view on an enlarged scale taken along line 5—5 of FIG. 2.
Figure 6:
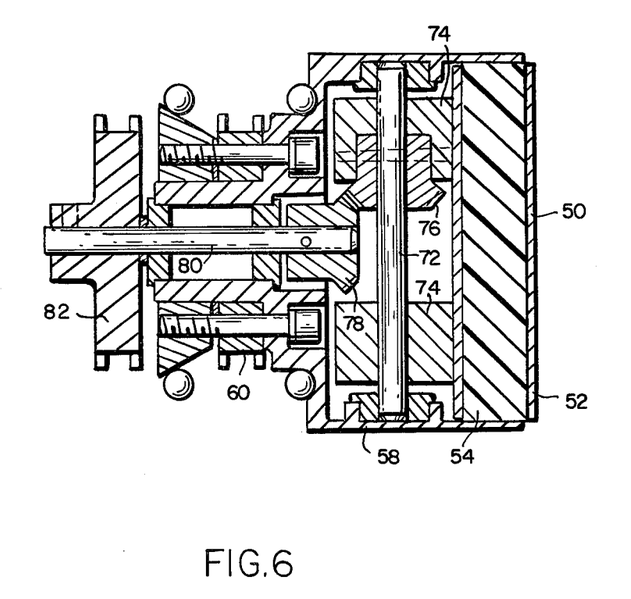
FIG. 6 is a sectional view taken along line 6—6 of FIG. 5.
Figure 7:
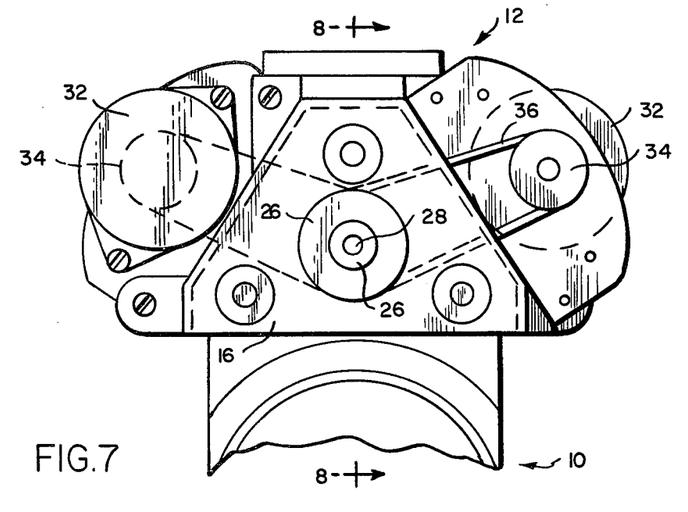
FIG. 7 is an end view taken along line 7—7 of FIG. 1.
Figure 8:
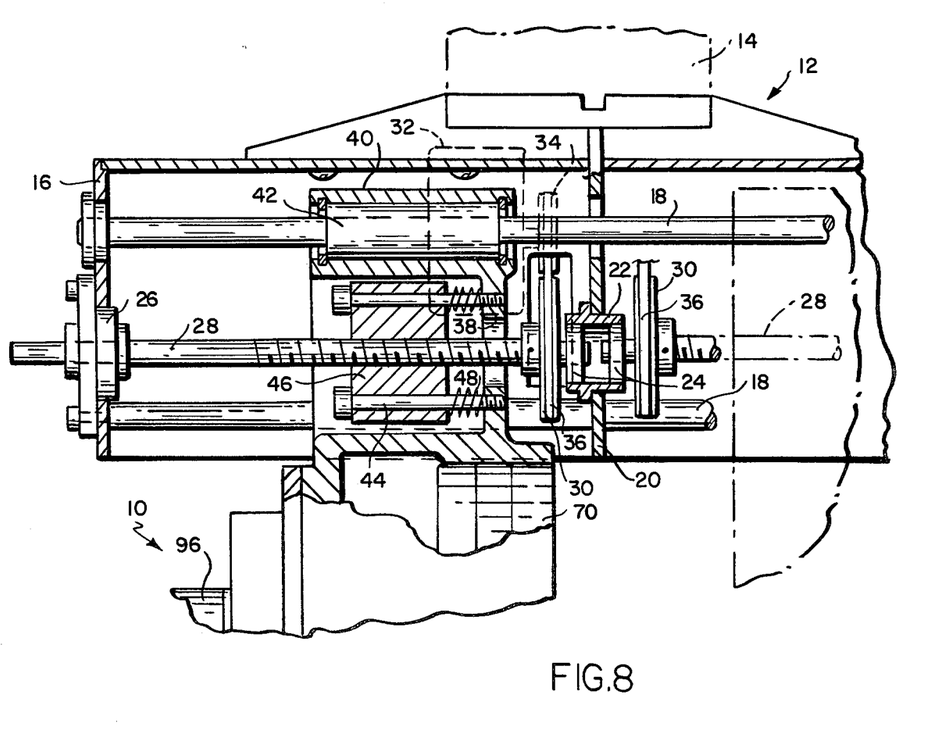
FIG. 8 is a sectional view taken along line 8—8 of FIG. 7.

As can be best seen in FIGS. 5 and 6, the platform 58 has a rotatable cross-shaft 72 carrying both drive wheels 74 in driving contact with the belt 52, and a bevel gear 76. The bevel gear 76 meshes with another bevel gear 78 on the end of a perpendicular shaft 80. The end of shaft 80 protrudes rearwardly from the platform and has mounted thereon a sprocket 82. With reference to FIGS. 3 and 4, it will be seen that the sprocket 82 is connected via chain 84 to a sprocket 86. Another idler sprocket mounted on an adjustable bracket 85 provides a means of adjusting chain tension. The sprocket 86 is connected to a coaxially arranged planetary follower gear 88 carrying a planet gear 90 meshing with both affixed internal ring gear 92 and a sun gear 94 on the output shaft of another reversible motor 96 mounted on the outer side of the finger assembly 10. The motor 96 and the above-described components drivingly connecting it to the belt 52 are included as part of a "third operating means".

Referring again to FIG. 2, it will be seen that a second contact member or plate 98 is arranged at the lower end of the finger assembly 10 adjacent to the contact surface 50 of the belt 52. The plate can take on any one of various configurations, as long as rotation of the belt 52 about axis "X" is not impeded. Preferably, the plate 98 will be somewhat arcuate, partially surrounding the belt 52 except for the area at the bottom of the finger assembly 10. As shown in FIG. 3, the plate 98 is supported by a plurality of pins 100 (only one being shown in FIG. 3) which extend through and are axially movable within cylindrical sleeves 102. The sleeves 102 provide coaxial extensions of cylinders 104 connected via intermediate passageways 106 to a pressure manifold 108. Each pin 100 has a piston head 100a slidably received in a cylinder 104. A compression spring 110 is arranged between each piston head 100a and the adjacent base of the sleeve 102 extending coaxially from the cylinder 104. When a pressurized medium such as compressed air is admitted to the manifold 108 to act on the piston heads 100a, the resulting force will compress the springs 110 and cause the plate 98 to shift from a retracted inoperative position behind the plane "P" of the belt contact surface 50, as shown by the solid lines in FIG. 3, to an advanced operative position in front of the plane P as shown at 98' by the broken lines in the same view. When the fluid pressure in manifold 108 is relieved, the compressive force of the springs 110 will return the plate 98 to its retracted inoperative position. The above-described components which serve to reciprocate the plate 98 between its operative and inoperative positions comprise a "fourth operating means".

Figure 9:
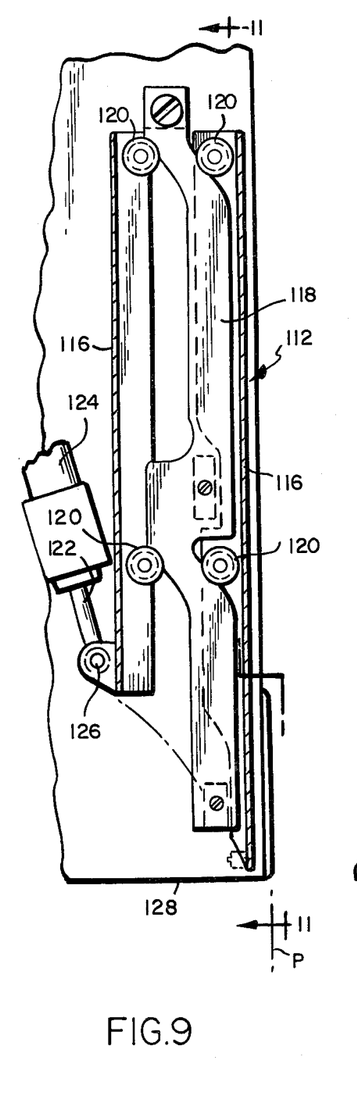
FIG. 9 is a front view of a selection member in the retracted inoperative position with its front plate broken away in order to better show internal components.
Figure 10:
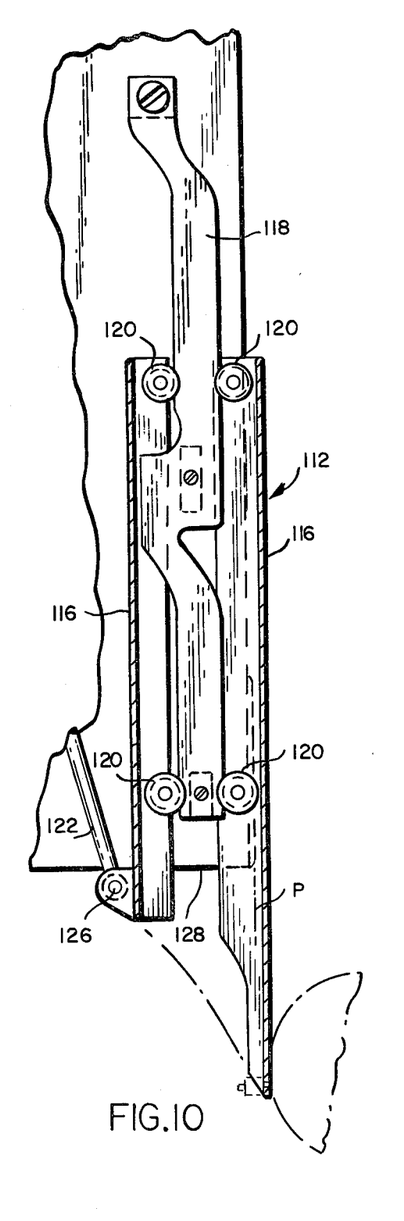
FIG. 10 is a view similar to FIG. 9 showing the selection member extended to its operative position.
Figure 11:
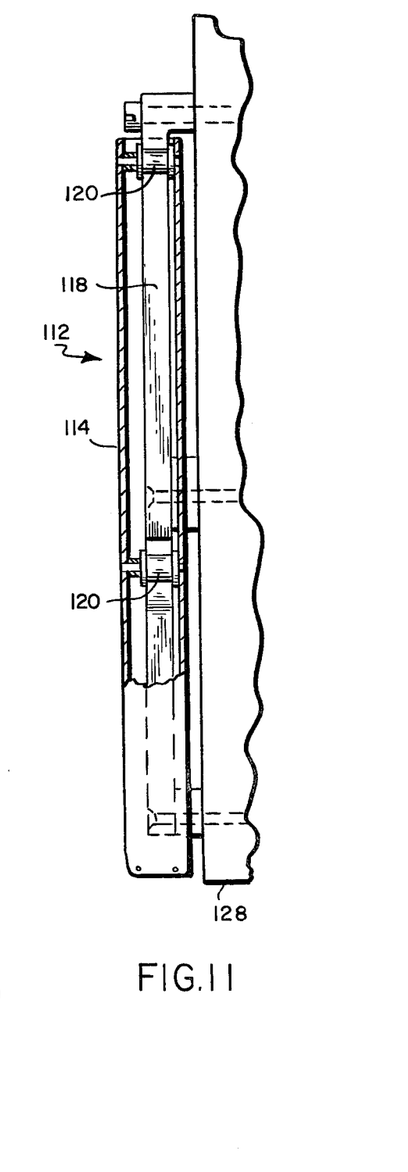
FIG. 11 is a partial side and sectional view taken along line 11—11 of FIG. 9.

Referring now to FIG. 1, it will be seen that each finger assembly 10 is provided with a selection member 112 having a relatively sharp end 112'. Referring additionally to FIGS. 9-11, it can be seen that the selection member has a top plate 114 and side walls 116 at least partially enclosing a cam track 118 secured to the exterior of the finger assembly. The top plate 114 supports pins carrying rollers 120 arranged to ride along the contoured edges of the cam track 118. The piston rod 122 of a double acting air cylinder 124 is connected to the selection member as at 126. The air cylinder 124 comprises a "fifth operating means" for moving the selection member in a direction transverse to axis "X", between a retracted inoperative position as shown in FIGS. 9 and 11, where it is behind the plane P of the contact surface 50 of the belt 52 and above the lower edge 128 of the finger assembly 10, and an operative position in front of the plane P and beyond the lower edge 128, as shown in FIG. 10. Thus, as the selection members are extended, they gradually move towards one another, and as the selection members are retracted, they gradually move away from one another.

Returning to FIG. 1, the operation of the apparatus will now be described in connection with the selection and manipulation of a typical randomly arranged workpiece, for example a sleeve "S", located in a storage bin or the like. One or both of the motors 32 are initially actuated to move the finger assemblies 10 along the axis "X" until they are positioned over the sleeve S with the distance between the contact surfaces 50 of the belts 52 being slightly larger than the sleeve diameter. If the sleeve was on a flat surface and if its axis was approximately transverse to axis X, it might then be possible to simply lower support 14 until the contact surfaces 50 were located on either side of the sleeve. However, where the sleeve is arranged randomly in a pile of other like sleeves, this may not be possible. Under such conditions, as illustrated in FIG. 1, the cylinders 124 are operated to extend the selection members 112 to operative positions gripping the sides of the sleeve S, as indicated in FIG. 1 by the broken lines at 112a. It will be understood from the previous discussion that the cooperative relationship between the guide rollers 120 and the contoured edges of the cam tracks 118 causes the selection members to gradually move together as they are being extended. After the sleeve S has been gripped by the selection members, the cylinders 124 are again operated to retract the selection members. Simultaneously, as the sleeve S is being elevated by the selection members to a location between the finger assemblies, the reversible motors 32 are actuated to gradually bring the finger assemblies together to grip the sleeve S between the contact surfaces 50 of the belts 52. At this stage, as shown schematically in FIG. 12A, the sleeve axis will be at an angle relative to a horizontal axis Y perpendicular to the axis X. Thereafter, any number of different movements can be imparted to the sleeve S. For example, by simultaneously moving the finger assemblies 10 together through appropriate operation of the motors 32, translational movement can be imparted to sleeve S along axis X in either direction. Also, by operating the motors 96 to move the belts 52 in either direction, translational movement can be imparted to the sleeve S along axis Y.

By temporarily gripping the sleeve S between the plates 98 (the extension of which is accompanied by a slight movement of the finger assemblies away from each other along axis X) the motors 70 then can be operated to rotate the belts 52 about axis X to align their direction of linear movement with the axis of the sleeve. Thereafter, by regripping the sleeve between the belts 52 and then returning the belts to their original positions with their direction of linear movement in line with axis Y, as shown in FIG. 12B, translational movement again can be imparted to the sleeve along axis X. Also, by employing the motors 96 to move the belts in unison, the sleeve S now can be moved axially along axis Y.

Figure 12A:
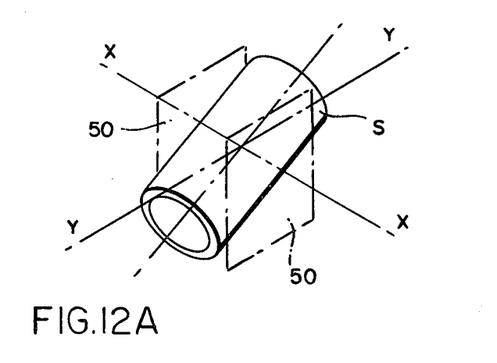
FIGS. 12A–12C are schematic illustrations of some of the movements that can be imparted to a workpiece by the apparatus of the present invention.
Figure 12B:
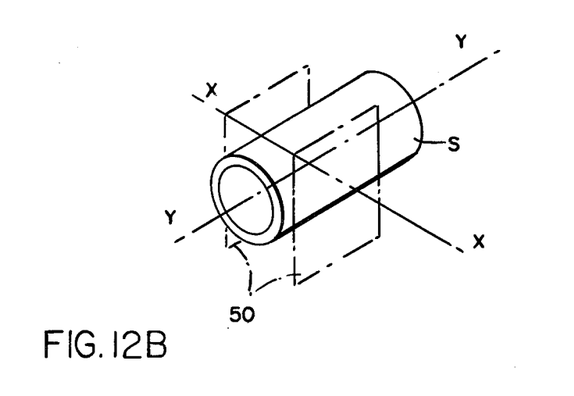
Figure 12C:
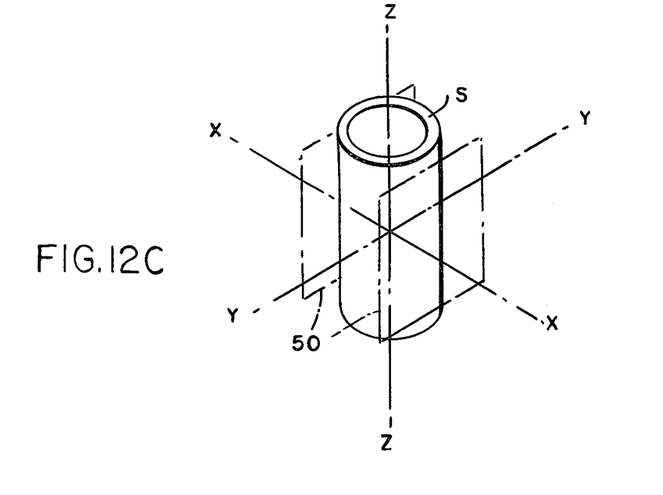

With reference to FIG. 12C, it will be seen that by alternately employing the plates 98 and the rotation of belt members 52 about axis X, the sleeve S can be oriented at which its axis is aligned with a third axis Z perpendicular to both axes X and Y. Thereafter, by simultaneously moving the belts in opposite directions, the sleeve can be rotated about axis Z. It can also be moved bodily along axis Y by simultaneously operating the belts in the same direction.

In light of the above, it will be understood that the movements shown in FIGS. 12A–12C are but a few of those that are possible with the present invention. If desired, all of these movements can be accomplished while the support or arm 14 is in motion and the sleeve S is being carried to another processing location.

We claim:

1. Apparatus for manipulating an element such as for example a workpiece being subjected to a manufacturing process, said apparatus comprising:
   a first contact member including a pair of finger assemblies having contact members arranged in a confronting relationship,
   first operating means for moving said finger assemblies along an axis towards each other to grip an element between said contact members and away from each other to release the element;
   second operating means for rotating said contact members about said axis in order to impart a corresponding rotation to an element gripped therebetween;
   third operating means for moving said contact members relative to one another in either the same or opposite parallel directions transverse to said axis, whereupon movement of said contact members in the same direction will impart translational movement to an element gripped therebetween in a direction transverse to said axis, and movement of said contact members in opposite directions will impart rotational movement to an element gripped therebetween about a second axis transverse to said first mentioned axis; and
   a second contact member arranged adjacent to the first-mentioned contact members of each finger assembly, each second contact member being movable relative to the element contacting surfaces of its respective first-mentioned contact member between an inoperative position behind the plane of said contacting surface and an operative position in front of the plane of said contacting surface, and fourth operating means for reciprocating said second contact members between said operative and inoperative positions, whereupon where an element is gripped between said operatively positioned second contact members, said second operating means may be employed to rotate said first-mentioned contact members about said first-mentioned axis.

2. The apparatus of claim 1 wherein said contact members comprise endless belts.

3. The apparatus of claim 1 wherein each of said finger assemblies carries a platform rotatable about said first-mentioned axis by said second operating means, and wherein said contact members are carried on said platforms for rotation therewith.

4. The apparatus of either claims 1, 2 or 3 wherein said first, second and third operating means are independently operable.

5. The apparatus of claim 1 wherein said second contact members partially surround said first-mentioned contact members.

6. The apparatus of claim 1 wherein said first operating means is operable additionally to move said finger assemblies simultaneously in either direction along said axis in order to impart corresponding translational movement to an element gripped between said contact members.

7. The apparatus of claim 1 further comprising a selection member carried by each finger assembly, each selection member being movable in a direction transverse to said axis between an inoperative position behind the plane of the contact surface of its respective finger assembly's contact member, and an operative position in front of said plane and beyond the end of its respective finger assembly, and fifth operating means for moving said selection members between said operative and inoperative positions.

8. The apparatus of claim 1 wherein said finger assemblies are mounted on a common movable support.

9. Apparatus for manipulating an element, comprising:
   a pair of finger assemblies mounted on a common support, said finger assemblies having belts with contact surfaces arranged in a confronting relationship;
   first operating means for moving said finger assemblies along a first axis towards each other to grip an element between the contact surfaces of said belts;
   second operating means for rotating said belts about said first axis in order to impart a corresponding rotation said element;
   third operating means for moving said belts relative to one another in either the same or opposite directions in order to impart either translational movement to said element along a second axis perpendicular to said first axis or rotational movement about said second axis;
   said first, second and third operating means being operable independently of each other, and said first operating means being additionally operable to move said finger assemblies together in the same direction along said first axis to impart translational movement to said element along said first axis, and to move said finger assemblies along said first axis away from each other to release said element from between said contact surfaces.

* * * * *